United States Patent
Mader

(10) Patent No.: US 10,353,380 B2
(45) Date of Patent: Jul. 16, 2019

(54) TOOL IDENTIFICATION SYSTEM

(71) Applicant: Robert Bosch GmbH, Stuttgart (DE)

(72) Inventor: Andreas Mader, Michelstadt (DE)

(73) Assignee: Robert Bosch GmbH, Stuttgart (DE)

( * ) Notice: Subject to any disclaimer, the term of this patent is extended or adjusted under 35 U.S.C. 154(b) by 863 days.

(21) Appl. No.: 14/569,735

(22) Filed: Dec. 14, 2014

(65) Prior Publication Data

US 2015/0177731 A1 Jun. 25, 2015

(30) Foreign Application Priority Data

Dec. 23, 2013 (DE) ........................ 10 2013 227 084

(51) Int. Cl.
| | | |
|---|---|---|
| G05B 19/418 | (2006.01) | |
| G05B 19/402 | (2006.01) | |
| G05B 19/4155 | (2006.01) | |
| G05B 19/406 | (2006.01) | |
| B25F 5/00 | (2006.01) | |

(52) U.S. Cl.
CPC ............ *G05B 19/4183* (2013.01); *B25F 5/00* (2013.01); *G05B 19/402* (2013.01); *G05B 19/406* (2013.01); *G05B 19/4155* (2013.01); *G05B 2219/31095* (2013.01); *G05B 2219/31283* (2013.01); *G05B 2219/37435* (2013.01); *G05B 2219/45135* (2013.01); *G05B 2219/49001* (2013.01)

(58) Field of Classification Search
CPC ............ G05B 19/402; G05B 19/4155; G05B 2219/45135; G05B 2219/49001; G05B 19/406; G05B 2219/37435; G05B 19/4183; G05B 2219/31095; G05B 2219/31283; A61B 17/1626; A61B 17/00221; B25F 5/00; B25F 5/02; H04W 4/02; H04W 4/029; H04W 4/80; H04W 84/10; Y10T 408/172
See application file for complete search history.

(56) References Cited

U.S. PATENT DOCUMENTS

| | | | | |
|---|---|---|---|---|
| 5,401,229 | A * | 3/1995 | Otsuka | B23Q 3/15546 198/465.1 |
| 7,613,590 | B2 * | 11/2009 | Brown | A61B 5/0002 702/188 |
| 7,784,104 | B2 * | 8/2010 | Innami | B25F 5/00 726/2 |
| 9,141,105 | B2 * | 9/2015 | Trepina | G05B 19/406 |
| 9,256,988 | B2 * | 2/2016 | Wenger | B25F 5/00 |
| 2006/0179473 | A1 * | 8/2006 | Innami | B25F 5/00 726/2 |

(Continued)

FOREIGN PATENT DOCUMENTS

DE 699 00 189 T4 3/2006

*Primary Examiner* — Crystal J Barnes-Bullock
(74) *Attorney, Agent, or Firm* — Maginot, Moore & Beck LLP

(57) ABSTRACT

A tool identification system for fitting to a tool includes a data memory configured to store data specific to the tool, and a standardized data interface configured to provide the data for a superordinate device having a corresponding data interface. The data memory is included in a microprocessor system configured to keep the standardized data interface ready, with the result that the data in the data memory can be read or written by a device using the microprocessor system and using the standardized data interface.

12 Claims, 2 Drawing Sheets

(56) References Cited

U.S. PATENT DOCUMENTS

| | | | |
|---|---|---|---|
| 2010/0023156 A1* | 1/2010 | Trepina | G05B 19/406 |
| | | | 700/175 |
| 2014/0070924 A1* | 3/2014 | Wenger | B25F 5/00 |
| | | | 340/10.1 |
| 2015/0097674 A1* | 4/2015 | Mondal | H04W 4/029 |
| | | | 340/572.1 |
| 2015/0182230 A1* | 7/2015 | Belagali | A61B 17/14 |
| | | | 606/82 |
| 2016/0311094 A1* | 10/2016 | Mergener | B25F 5/00 |

* cited by examiner

TOOL IDENTIFICATION SYSTEM

This application claims priority under 35 U.S.C. § 119 to patent application no. DE 10 2013 227 084.4, filed on Dec. 23, 2013 in Germany, the disclosure of which is incorporated herein by reference in its entirety.

The disclosure relates to a tool identification system, to a resistance welding apparatus and to a welding gun.

BACKGROUND

Comparable components are known from DE 699 00 189 T4. The welding system shown here comprises a control and/or regulating device and a source for the welding current, which source is composed of a power controller and a welding transformer. The welding gun is connected to the welding transformer and the welding electrodes of the gun are pressed against the metal sheets to be welded. In this case, the welding voltage is recorded using the first measuring line which leads to the control and/or regulating device. The welding current is measured using a Rogowski belt which is likewise connected to the control and/or regulating device via a second measuring line. A third and a fourth measuring line for the electrode force and the electrode travel are likewise required. An EEPROM is additionally fastened to the welding gun and forms the local data memory for the control and/or regulating parameters, in particular the reference values and reference curve profiles specific to the welding gun. The EEPROM is also connected to the control and/or regulating device via a further, fifth data line. For this purpose, a connector is arranged at the end of the cable and is inserted into a socket on the control and/or regulating device.

As can be gathered from the statements above, the memory (EEPROM) is connected to the control and/or regulating device by means of a data line which must be inserted into the control and/or regulating device. This is a proprietary solution because the data are stored and processed in manufacturer-specific data formats and because the data line has a manufacturer-specific configuration. This has the disadvantage that the data line, the data formats and the plug-in connections cannot be universally used inside welding systems from different manufacturers. Therefore, it is not possible to interchange data across different manufacturers and manufacturer-specific hardware and/or software is/are needed to read the data from the data memory. This hardware and/or software must be purchased by the customer.

SUMMARY

The disclosure proposes a solution which eliminates the above-mentioned disadvantages and provides a universally usable solution which enables manufacturer-independent identification of tools, in particular in the form of welding guns, by means of devices, in particular in the form of welding controllers. If the customer opts for solutions from a wide variety of manufacturers, this is no longer an obstacle because no proprietary solutions, as shown in the prior art, are used in the disclosure.

The disclosure is first of all generally based on a tool identification system which comprises a microprocessor system having a data memory and keeps a standardized data interface, in particular based on the Ethernet standard, ready. Said means is used to store data which uniquely characterize a tool or define its operating parameters, for example the tensile force, the travel and the operating hours of a rivet attachment or the mechanical properties and components of a welding gun.

The means according to the disclosure can be arranged on any desired tool, with the result that the tool can again be uniquely identified by a device, which uses or operates the tool, using the standard interface. The tool is permanently connected to the tool identification system according to the disclosure. The tool identification system remains on the tool in the event of a tool change. The above-mentioned operating parameters can be retrieved by the device, to which the tool is connected, and can possibly be changed using an operator interface included in the device.

Alternatively, the tool identification system may also initially be connected to a computer, also from the group of smart devices such as smartphones or tablet PCs. The user interface (display and keyboard) of the computer can be used to initially adapt the tool parameters stored in the data memory for a new device before the tool identification system is connected to the new device, as described above.

The microprocessor system is preferably implemented using a compact microprocessor system which ideally combines all components, including the standardized data interface, on a single printed circuit board. Welding guns, in particular, which are moved inside automobile bodies by means of robots require sizes which are as small as possible and smooth contours so that the tool identification system is not inadvertently damaged or pulled off when moving the welding gun from the automobile body. The proposed compact system enables such a space-saving structure.

An executable operating system and/or an embedded web server and/or an embedded file transfer protocol such as (T)-FTP and/or a file management means (also referred to herein as a file management device) for managing the data in the data memory is/are preferably implemented on the microprocessor system. As soon as contact is made with the microprocessor system with its supply voltage, the executable software starts, for example in the form of a boot process, if an operating system is present. All of the components of the microprocessor system are initialized in this case and prepared for operation. Both an external supply voltage and an internal supply voltage in the form of a rechargeable battery or a battery are possible as the supply voltage.

Any desired device with a corresponding data interface and a web browser can make contact with the embedded web server. The data stored in the data memory can therefore be displayed and changed independently of a manufacturer using standard protocols and standard interfaces.

A corresponding user interface (GUI) is provided by the browser for this purpose. The content of this user interface is tailored to the tool which is intended to comprise the tool identification system according to the disclosure and the user interface displays the tool-specific parameters in a user-friendly manner using suitable output fields and input fields on the display of the device to which the tool identification system is connected.

The data are stored in the data memory using a defined and standardized file structure. This also enables manufacturer-independent access to the data stored in the data memory.

The data memory is preferably implemented using an EEPROM or a buffered RAM or a flash memory or an NV RAM. The memory preferably additionally comprises an automatic data backup mechanism if the supply voltage is switched off or is lost during operation. The choice of the memory depends, inter alia, on the prevailing operating conditions and the voltage supply. The flash memory ensures non-volatile storage with a simultaneously low energy consumption. The flash memory is miniaturized, with the result that the microprocessor system can have a very compact structure. In the case of the EEPROM memory, the smallest addressable memory units can also be individually deleted, which enables more efficient memory management and can save storage space.

It is also possible to use microcontroller solutions which may possibly comprise all components inside a single module. This makes it possible to also fit the tool identification system to very small tools.

The tool identification system is preferably arranged on a tool in the form of a welding gun, for example on one of the gun arms. All of the applications and advantages described above for a tool and a device can be applied to a welding gun (tool) and an associated device (welding controller).

However, the tool identification system could also be arranged on the welding gun transformer which often forms a structural unit together with the welding gun or is held by the welding gun. Apart from that, the tool identification system could also additionally contain data specific to the welding transformer.

The disclosure has the advantage that the device (for example a welding controller) can recognize a tool (for example a welding gun) as such, completely independently of a working process to be carried out with the tool. In addition, it would then also be conceivable to at least temporarily store information relevant to a working process inside the memory.

The disclosure likewise includes a resistance welding apparatus having a welding controller and a welding gun as described above, the welding controller being connected to the microprocessor system using the data interface. The welding controller can therefore uniquely identify a connected welding gun with its mechanical properties and components and can possibly parameterize itself on the basis of this information.

The disclosure likewise includes a computer, also from the group of smart devices such as smartphones or tablet PCs, and a welding gun as described above, the computer being connected to the microprocessor system using the data interface. The computer can therefore uniquely identify a connected welding gun with its mechanical properties and components, for example for the purpose of maintenance.

The disclosure likewise includes a method for starting up or maintaining a welding gun as described above, having the following steps of
connecting the microprocessor system included in the welding gun, by means of the data interface, to a device having a corresponding data interface, also from the group of smart devices such as smartphones or tablet PCs; storing data specific to the welding gun in the data memory; connecting the microprocessor system included in the welding gun, by means of the data interface, to a welding controller having a corresponding data interface; reading the data specific to the welding gun from the data memory using the welding controller.

If a welding gun now arrives at a corresponding workshop for maintenance, the tool data which are stored in a file in the data memory can be read using a PC or the like. If parameters have been changed during maintenance, they may be changed in the file on the PC and written to the data memory again. If the welding gun which has undergone maintenance now arrives back at the system (line), the parameters need only be read into the welding controller using the standard interface.

The disclosure likewise includes a method for changing a welding gun as described above, having the steps of:
connecting the microprocessor system included in the welding gun, by means of the data interface, to a welding controller having a corresponding data interface, reading the data specific to the welding gun from the data memory using a welding controller.

If the welding gun is removed from the system, it also takes its parameters with it. The welding gun can now be operated in a different system. Only the parameters from the tool identification system need to be read into the welding controller.

The disclosure likewise includes a method for managing the content of the data memory of a welding gun as described above, having the steps of:
connecting a computer, also from the group of smart devices such as smartphones or tablet PCs, having a data interface, a display and an executable Internet browser to the tool identification system and visualizing the data stored in the data memory by means of the Internet browser using the display.

The gun manufacturer for welding guns can therefore start up the welding guns in the workshop and, at the end of start-up, can store all important data which are required for subsequent operation of the welding guns in the tool identification system. During start-up in the system, the parameters then only need to be read from the tool identification system into the welding controller.

The data in the data memory are preferably stored or read, preferably within a data structure, using the Internet browser.

The Internet browser is now particularly preferably used to provide a graphical user interface (GUI) which visualizes the mechanical properties of the tool such as its geometry and/or its dimensions and/or its components, in particular also the drive components included in the tool such as electrical, hydraulic or pneumatic drives. If appropriate, this visualization can even be carried out dynamically or on the basis of the components.

The steps shown here considerably facilitate the start-up of a welding gun and shorten the waiting times.

DETAILED DESCRIPTION

Figure 1:
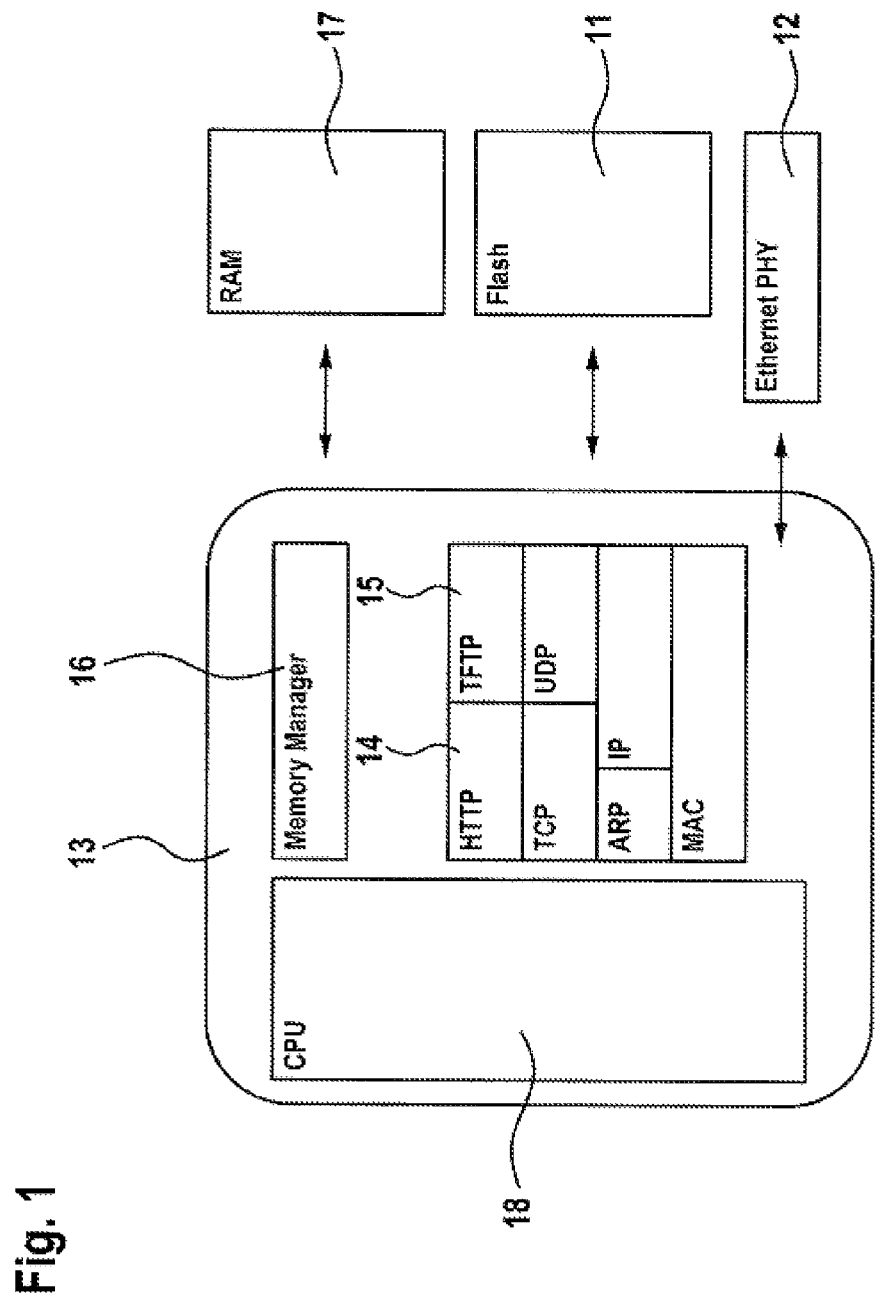
FIG. 1 shows the tool identification system.

FIG. 1 shows the internal structure of the tool identification system, namely the data memory 11, which stores data specific to the tool (not shown), and the data interface 12 for providing the data for a superordinate device (not shown) having a corresponding data interface. The data memory 11 is included in a microprocessor system 13 or is connected to such a system. The data interface 12 is an Ethernet interface.

The data in the data memory 11 can be read and/or written by an industrial PC or a smartphone, tablet PC and the like using the microprocessor system 13 and by means of the physical Ethernet interface 12 using the components of the microprocessor system 13 such as the CPU 18, the internal memory management 16 and the available protocols, for example TFTP 15.

At least one embedded HTTP server 14 and an embedded TFTP server 15 and a file management means for managing the data in the data memory are implemented in an executable manner on the microprocessor system 13.

By means of the disclosure, data can be stored in the data memory 11 and read from the latter using any desired Ethernet-compatible PC. These data can be viewed, via the integrated HTTP server 14, using a commercially available Internet browser. Data can be managed in the data memory 11 in a file-oriented manner.

By means of the data stored in the data memory 11, the tool can automatically register with and make itself known to a machine by means of which it is operated.

The system 13 may have a small and cost-effective structure. For storing the data, the system 13 has the flash data memory 11 for storing data in a non-volatile manner and a RAM data memory 17 for storing the code to be executed by the CPU 18 or for use as a temporary memory for the CPU 18.

Since a HTTP server 14 and a TFTP server 15 are provided in the microprocessor system 13, the data stored in the microprocessor system 13 can be accessed using common computers or controllers (welding controllers, PLC, motion controllers and the like) and the data memory 11 provided there can be used as a parameter memory. Since the storage is carried out in a file-oriented manner, this is a manufacturer-independent form of data storage, that is to say a customer does not require any proprietary tools for accessing data, but rather can use commercially available hardware.

The Ethernet interface 12 could also be implemented as a wireless interface; for this purpose, a WLAN module would then need to be provided in the tool identification system (not shown). Alternatively, Bluetooth or other standards known for radio transmission could also be used and provided.

The disclosure is used, for example, in welding cells, as are known from automobile manufacture. Such a welding cell comprises the arrangement shown in FIG. 2, for example.

Figure 2:
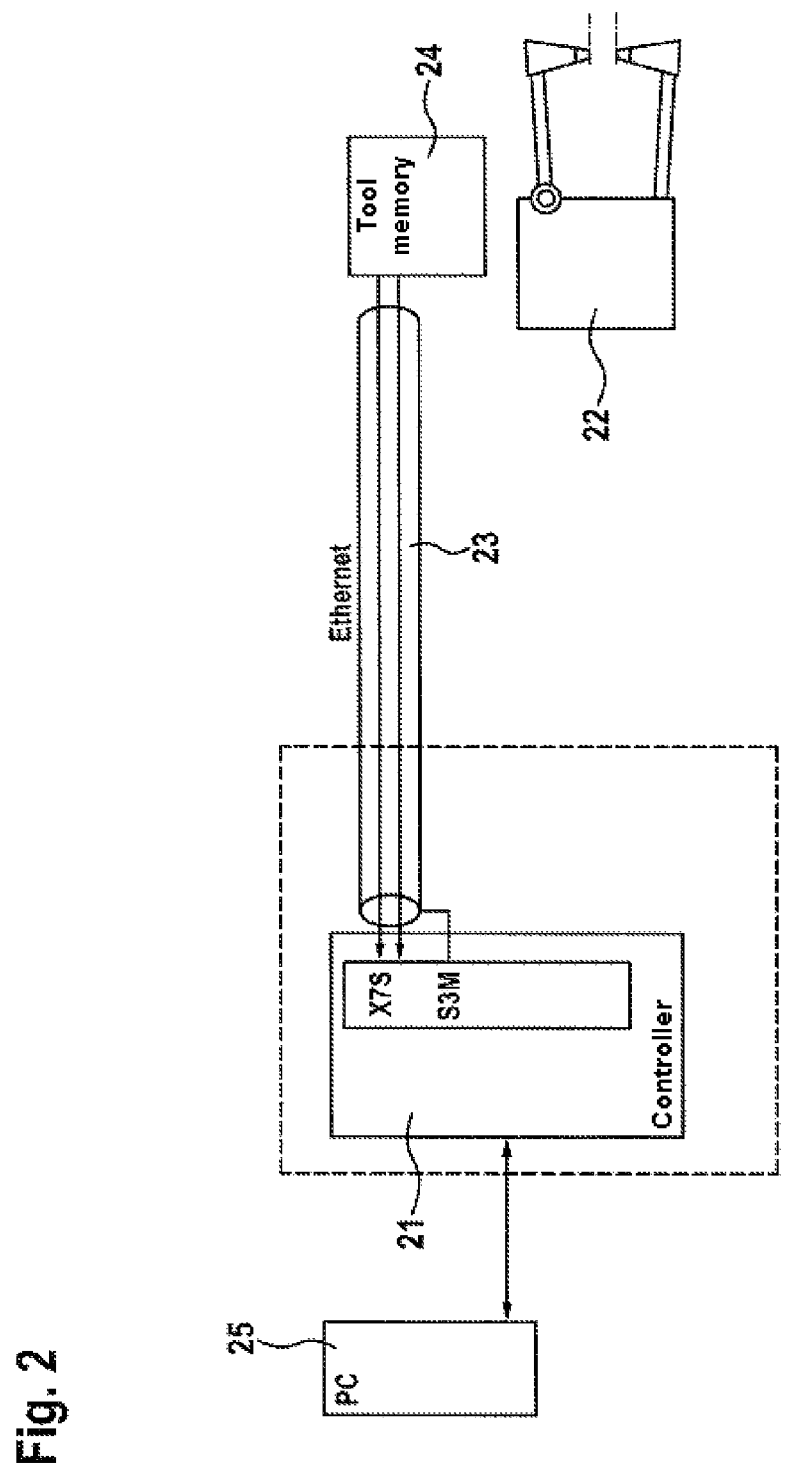
FIG. 2 shows the components of a resistance welding apparatus.

FIG. 2 shows a resistance welding apparatus having a superordinate device 25 in the form of an industrial PC 25, having a welding controller 21, a wired or wireless Ethernet connection 23, a tool memory 24 and a welding gun 22. The tool memory 24 is permanently mounted on the welding gun 22. The Ethernet connection 23 runs between the tool identification system 24 and the welding controller 21 and connects both systems to one another. The parameters stored in the welding controller 21 for operating the welding gun 22 can be read and changed using the industrial PC 25 connected to the welding controller 21. User communication is carried out using a user interface (GUI) included in the industrial PC 25.

What is claimed is:

1. A tool identification system for fitting to a tool, comprising:
    a data memory configured to store data specific to the tool;
    a standardized data interface configured to provide the data specific to the tool to a superordinate device having a corresponding data interface; and
    a microprocessor operatively connected to the data memory and the standardized data interface, the microprocessor configured to:
        retrieve the data specific to the tool from the tool via the standardized data interface with standardized data protocols;
        transmit the data specific to the tool from the data memory of the tool identification system to the superordinate device with standardized data protocols via the standardized data interface in response to a request received from the superordinate device via the standardized data interface; and
        write parameterized data received from the superordinate device to the data memory to control operation of the tool based on the data specific to the tool.

2. The tool identification system according to claim 1, wherein the microprocessor is configured to execute software instructions stored in the data memory to implement an embedded web server for managing the data specific to the tool in the data memory.

3. The tool identification system according to claim 1, wherein the data memory is implemented using an EEPROM, a buffered RAM, or a flash memory.

4. The tool identification system according to claim 1, wherein:
    data elements are stored in the data memory, and
    the data elements describe mechanical properties of the tool including a geometry of the tool, dimensions of the tool, or components of the tool, with the result that the mechanical properties can be retrieved by the superordinate device.

5. The tool identification system according to claim 1, wherein the tool identification system is included in a welding gun.

6. The tool identification system according to claim 5, wherein:
    the welding gun and a welding controller are included in a resistance welding apparatus, and
    the welding controller is connected to the microprocessor using the standardized data interface.

7. The tool identification system according to claim 5, wherein a computer is connected to the microprocessor using the standardized data interface.

8. A method for starting up or maintaining a welding gun including a tool identification system comprising:
    connecting the tool identification system to a superordinate device having a corresponding data interface with a standardized data interface of the tool identification system;
    transmitting data specific to the welding gun from the superordinate device to the tool identification system according to standardized data protocols;
    storing the data specific to the welding gun in a data memory of the tool identification system;
    connecting the tool identification system to a welding controller having a corresponding standardized data interface with the standardized data interface of the tool identification system;
    reading the data specific to the welding gun from the data memory of the tool identification system using the connected welding controller; and
    automatically parameterizing the welding controller using the data specific to the welding gun,
    wherein the data memory of the tool identification system is included in a microprocessor system configured to keep the standardized data interface of the tool identification system ready, with the result that data in the data memory can be read or written by the superordinate device using the microprocessor system and using the standardized data interface according to the standardized data protocols.

9. The method according to claim 8, wherein the method is used to change the welding gun.

10. The method of claim 8, wherein the method is used to manage content of the data memory, the method further comprising:

connecting a computer having a corresponding data interface, a display, and an executable Internet browser to the tool identification system with the standardized data interface; and displaying the data stored in the data memory with the Internet browser using the display.

11. The method according to claim 10, further comprising:

using the Internet browser to store or read a data element in the data memory of the tool identification system with a data structure configured to be selected by the user, wherein the data element relates to mechanical properties of the welding gun including a geometry of the welding gun, dimensions of the welding gun, and/or components of the welding gun.

12. The method according to claim 11, further comprising:

using the Internet browser to visualize the data elements using a graphical user interface.

* * * * *